United States Patent [19]

Wiesner

[11] 4,131,840
[45] Dec. 26, 1978

[54] CIRCUIT ARRANGEMENT FOR SETTING A ROTATABLE TYPE CARRIER OVER THE SHORTEST PATH OF ROTATION

[75] Inventor: Wolfgang Wiesner, Munich, Germany

[73] Assignee: Siemens Aktiengesellschaft, Berlin & Munich, Germany

[21] Appl. No.: 820,795

[22] Filed: Aug. 1, 1977

[30] Foreign Application Priority Data

Sep. 16, 1976 [DE] Fed. Rep. of Germany ....... 2641760

[51] Int. Cl.$^2$ ............................................. G05B 19/40
[52] U.S. Cl. ................................... 318/685; 318/603; 318/664
[58] Field of Search ..................... 318/685, 664, 603; 178/34

[56] References Cited

U.S. PATENT DOCUMENTS

| 3,399,753 | 9/1968 | Revelle | 318/603 X |
| 3,569,815 | 3/1971 | McNaughton | 318/664 X |
| 3,573,589 | 4/1971 | Berry | 318/685 X |
| 3,795,851 | 3/1974 | Gage et al. | 318/603 X |
| 3,823,265 | 7/1974 | Ludwig et al. | 178/34 |
| 3,826,964 | 7/1974 | Byrne | 318/603 X |

Primary Examiner—B. Dobeck
Attorney, Agent, or Firm—Hill, Gross, Simpson, Van Santen, Steadman, Chiara & Simpson

[57] ABSTRACT

A circuit arrangement is provided for setting a type carrier, having character types arranged on the periphery thereof, from a present setting position to a new setting position over the shortest path of rotation, via a stepping motor, by means of pulse train elements derived from information characters input in binary form, where the relevant position of the type carrier can be read as a binary coded position character, in business machines, data machines, teleprinters or the like.

6 Claims, 3 Drawing Figures

CIRCUIT ARRANGEMENT FOR SETTING A ROTATABLE TYPE CARRIER OVER THE SHORTEST PATH OF ROTATION

BACKGROUND OF THE INVENTION

Field of the Invention

The present invention relates to a circuit arrangement for setting a type carrier which carriers character types in the region of its periphery, from a present setting position on the shortest path of rotation to a new setting position via a stepping motor by means of pulse train elements which are derived from information characters input in binary form, where the relevant position of the type carrier can be read as a binary coded position character, in business machines, data machines, teleprinters or the like.

Description of the Prior Art

In contrast to arrangements in which type carriers equipped with a plurality of types can be set by an aggregate motion transmission only within a setting angle of 360°, the setting possibilities in arrangements provided with servomotor or stepping motor drive systems for type carriers of this type are not subject to functional limits, i.e. mechanically the type carrier can be set from a set position into another desired position both in the one direction and in the opposite direction of rotation. In order to achieve the desired position for the type carrier as rapidly as possible, it is advantageous to select the shortest setting path. Mechanical transmissions are known which, operating under complicated laws of motion, set a type carrier in the direction of rotation into the next desired position by the shortest path of rotation. When stepping motors are used to set type carriers, a simple method of calculating the setting rotation direction is achieved, which can be executed with electronic switching units, when the type carrier possesses a total of $2^n$ setting positions, because, in fact, the electronic elements are normally organized in binary form.

A teleprinter for n-element codes is known in the art, which teleprinter has a type cylinder which can be adjusted, by rotation, in both directions by means of a stepping motor, as set forth in the German published application 2,154,899, wherein, in order to attain the next peripheral position of the type carrier to be set, from the last setting which was occupied, over the shortest possible path, a test binary counter is provided which can be set in the forward direction with a multiply higher pulse train, e.g. with a 200 kHz pulse train, and in which the requisite setting of the binary counter can be simulated, and that a pulse train counter is provided which can be controlled via this test binary counter, and which, whenever it is estimated that half the number of the print-out positions along the periphery, or less, is required to reach the end position, adjust the stepping motor in the forward direction, and when this number is overshot adjusts the stepping motor in the reverse direction.

With the aid of this known circuit arrangement, independently of the total number of type characters arranged on the periphery of a type character, it is possible to predetermine the direction of adjustment in which the type carrier is to be moved from a starting position into the next print-out position by the shortest path. On the other hand, the adjustment quantity is not determined, but the adjusting motion is terminated when, in a comparison of the drive value with the relevant position value of the type carrier, these two values are identical. However it is important to determine the adjustment quantity when the type carriers can be adjusted by controlled servo-motors, or in particular by stepping motors, and drive programs having acceleration and deceleration phases are to be used for longer adjustment paths.

SUMMARY OF THE INVENTION

The object of the present invention is to provide a circuit arrangement by means of which it is possible to determine the setting direction required to achieve the shortest path of rotation, and on the other hand the setting quantity required to set type carriers having character types on their peripheries, in particular by means of a stepping motor.

A circuit arrangement which meets these requirements is characterized, in accordance with the present invention, in that the binary coded information character for the new setting position and the binary coded information character of the type character are fed to a comparison circuit which, depending upon the values of the two binary characters relative to one another, emits a first evaluation signal. The sum value formed from the binary value of the low-value character and the inverted binary value of the higher-value character, and the binary value corresponding to half the number of possible setting positions of the type character are fed to a further comparison circuit which emits a second evaluation signal. A second evaluation signal operates further circuit units in such a manner that when the spacing quantity is established as being smaller than or equal to half the number of attainable type carrier positions, this determined spacing quantity is switched through as a value for operating the stepping motor, and when the spacing quantity is established as being greater than half the number of attainable type carrier setting positions, the difference between the number of attainable setting positions and the determined quantity is switched through as a value for operating the stepping motor. The first and second evaluation signals are fed to an EXCLUSIVE-OR logic linking unit which, when the information character which is to be newly set is greater than the position character of the type carrier, or when the spacing has been determined to be greater than half the number of attainable setting positions, emits a control command causing the drive motor to rotate in the opposite direction.

With the aid of the circuit arrangement designed in this manner, it is now possible to make available the direction of rotation required to set a type carrier, having type characters on its periphery, in order to achieve the shortest setting path, and also to make available the value for the actual setting quantity, to be made in this specific direction of rotation, for the operation of the drive motor. Here, the total number of setting positions of the type carrier which are to be achieved can be arbitrary.

In accordance with a preferred embodiment of the invention, the circuit arrangement is characterized in that the first evaluation signal is formed by a comparison circuit which compares the new information character which is to be set with the position character of the type character.

In accordance with another preferred embodiment of the invention, the circuit arrangement is characterized in that the first evaluation signal is formed by the outgoing carry from an adder circuit which, from the inverted value of the position character of the type carrier and the value of the newly set information character, forms the difference between these two values.

In accordance with a preferred further development, a circuit arrangement constructed in accordance with the present invention is characterized in that the second evaluation signal is fed to the further comparison circuit of an EXCLUSIVE-OR logic linking chain, which at its input is connected, in parallel, with the spacing quantity between the information character and the type carrier position character, and to an AND logic linking chain which is connected, in parallel, with the value, increased by one, of the attainable setting position, and that the outputs of these logic linking chains are logically linked to one another via an adder circuit.

On the basis of this preferred further development, the circuit arrangement of the present invention can be advantageously designed in that the EXCLUSIVE-OR logic linking chain, and the AND logic linking and the adder circuit are each shortened by one stage, and that furthermore the value of the attainable setting positions is connected to the AND logic linking chain, and the evaluation signal derived by the second comparison circuit is fed to the adder circuit as an input-end transfer signal.

BRIEF DESCRIPTION OF THE DRAWINGS

Other objects, features and advantages of the invention, its organization, construction and operation will be best understood from the following detailed description taken in conjunction with the accompanying drawings, on which:

FIG. 1 is a schematic logic diagram which illustrates the fundamental construction of an arrangement for driving a stepping motor, by way of which a type disc can be set in a data machine, teleprinter or the like;

DESCRIPTION OF THE PREFERRED EMBODIMENTS

Figure 1:
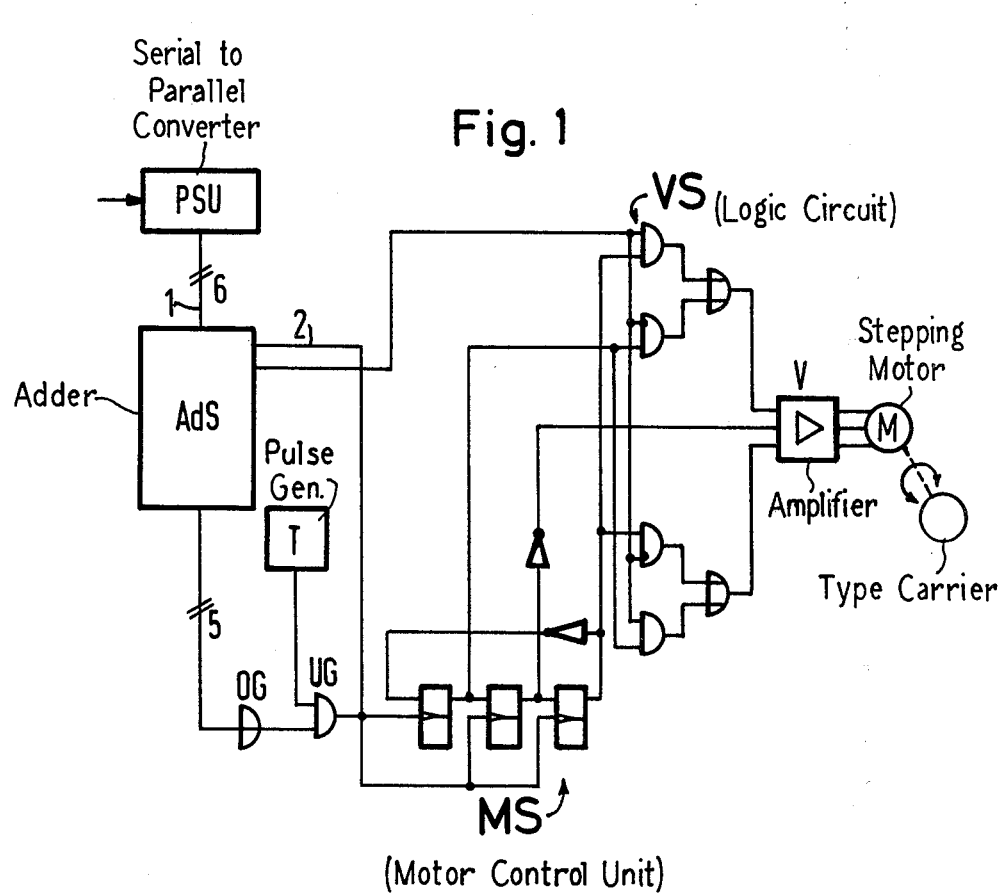
Figure 2:
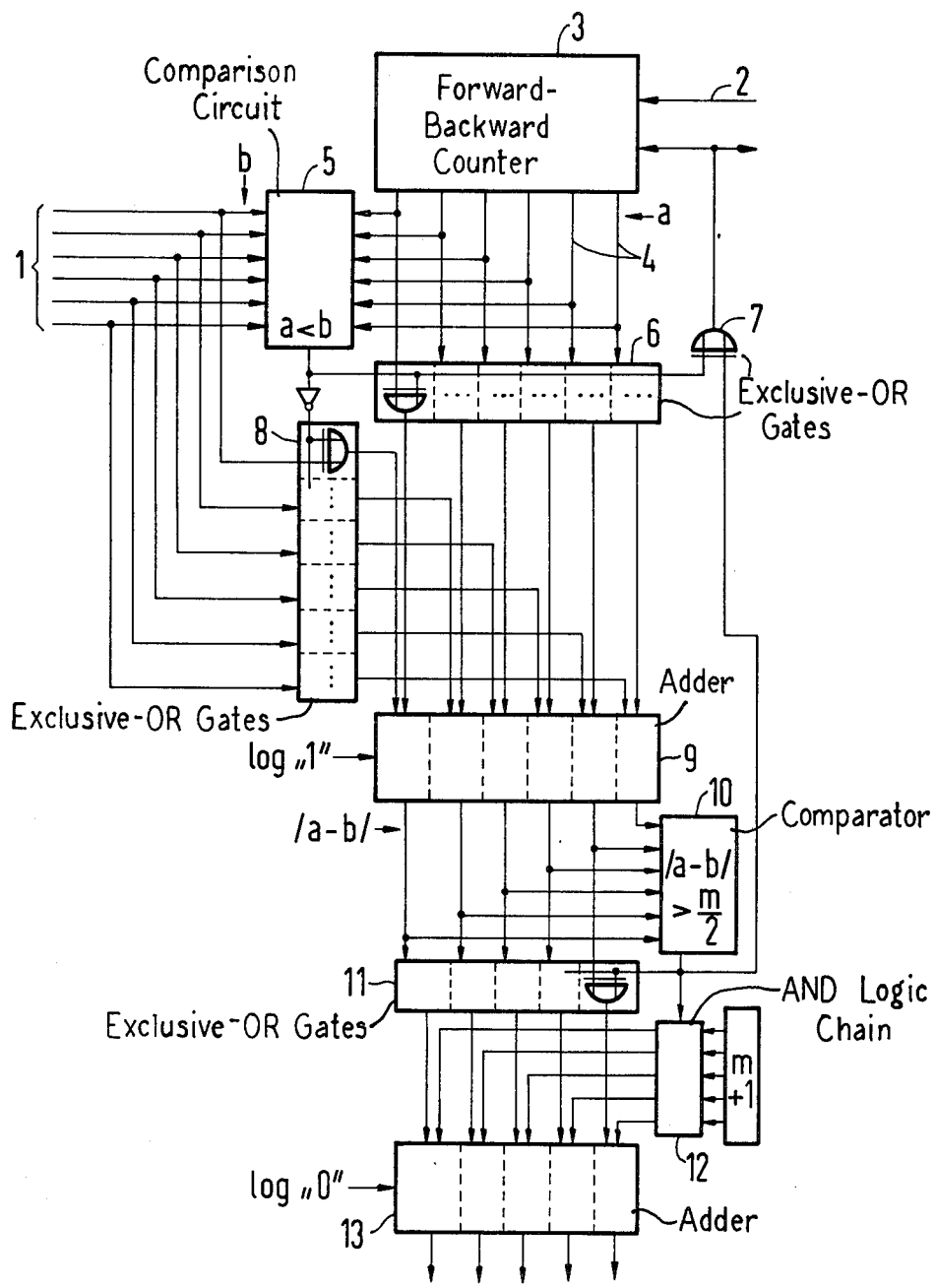
FIG. 2 is a schematic logic diagram of a first circuit arrangement for determining the direction of rotation for the shortest setting path, and for determining the setting quantity in order to set the type carrier.
Figure 3:
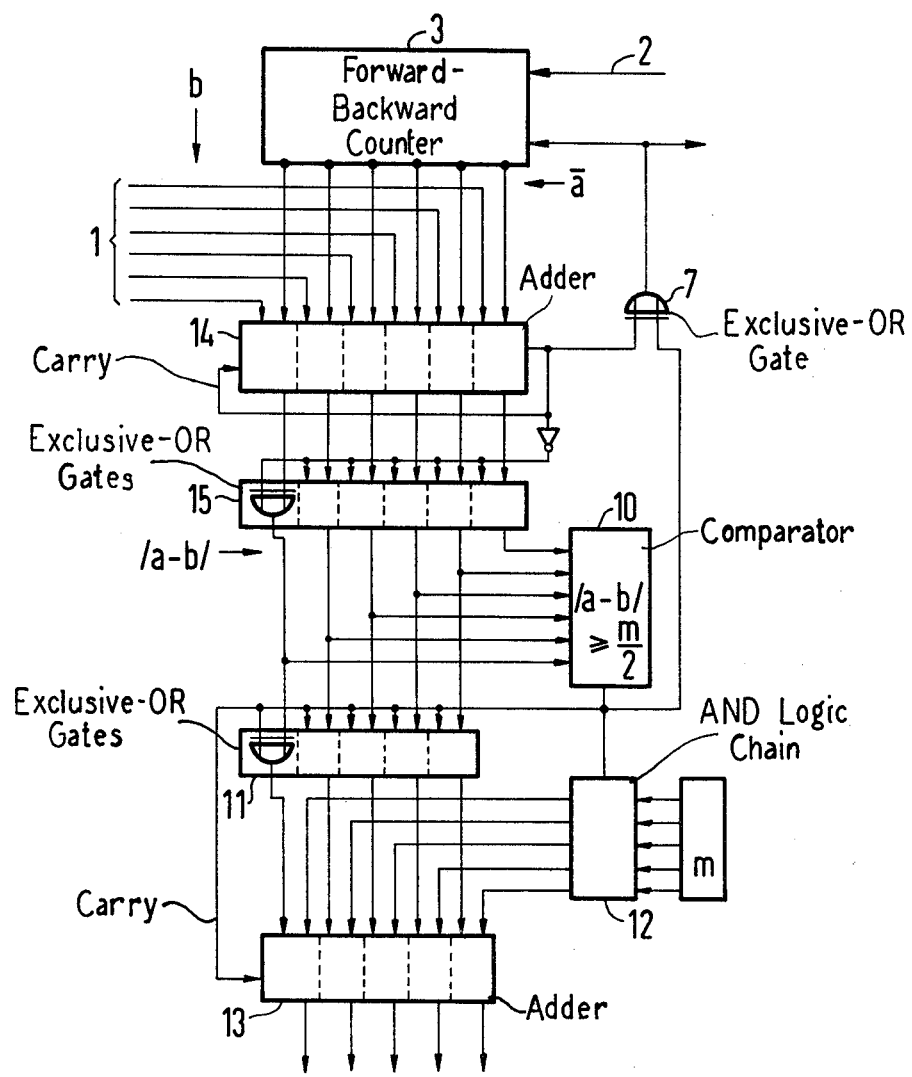
FIG. 3 is a schematic logic diagram of a second circuit arrangement for realizing the same goals as the circuit arrangement of FIG. 2.

Referring to FIG. 1, the code combination characters are fed in serial form to a series/parallel converter PSU and are then fed in parallel form to an adder circuit AdS, which is constructed in accordance with the features of the invention, as is illustrated for example in one embodiment in FIG. 2 and in another embodiment in FIG. 3. The adder circuit AdS is supplied by way of a line 2 with timing pulses which characterize the stepping on of the stepping motor M, and thus offer an item of information concerning the relevant position of the type carrier which is to be set. The difference value between the type carrier position which is to be newly set and the last set position is available in binary coded form at the output of the adder circuit. As long as a difference value is available, the difference value is fed by way of an OR gate OG to the input of an AND gate UG, by way of which the stepping-on pulse train for the stepping motor M is fed from a pulse generator T to a motor control unit MS. The motor control unit comprises a shift register which is provided with a reverse feedback, and is constructed from bistable trigger stages which are pulsed by the control signal. The outputs of the first and third stages of the shift register are connected to a logic circuit VS which is constructed from OR gates and AND gates and which, in dependence upon a signal emitted from the adder circuit AdS, selectively assigns these outputs to two inputs of an amplifier circuit V for driving the stepping motor. The output of the second trigger stage of the motor circuit MS is directly connected, in inverted form, to the input of the amplifier V.

The adder circuit AdS can be constructed in accordance with the exemplary embodiment of the invention illustrated in FIG. 2, or in accordance with the exemplary embodiment of the invention illustrated in FIG. 3.

The circuit arrangements are designed in such a manner that the type carrier can assume up to 64 setting positions. If only up to 32 setting positions are required, the number of stages of the individual circuit units can be reduced by one; if, on the other hand, a character supply of up to 128 setting positions is to be used, the individual circuit units must be extended by one stage.

The circuit arrangement illustrated in FIG. 1 is supplied by way of six parallel input lines, columnly referenced 1, with binary coded information characters b, which characterize the new type carrier position which is to be set. The type carrier can be set in m setting positions, where the relevant position of the type carrier is emitted, as a binary coded position character a, by a counter circuit 3 operated via a control line 2, as illustrated in both FIGS. 2 and 3. The counter circuit 3 is in a position to count forward or backward, depending upon rotation of the type carrier, and in fact may be constructed in the form of a ring counter having a counting length of 0 to m-1, i.e. on m positions. The information character b supplied by way of the input lines 1 and the type carrier position character a available on the output lines of the counter circuit 3 are supplied to a comparison circuit 5 (FIG. 2). Whenever the binary value of the information character b is greater than the value of the position character a, at the output of the comparison circuit 5 there is emitted a first evaluation signal which is fed, in inverted form, to an EXCLUSIVE-OR logic linking chain 6, to which the position character a is likewise applied, and to an EXCLUSIVE-OR logic linking element 7 and to a further EXCLUSIVE-OR logic linking chain 8 to which the information character b is also applied.

If the counting value of the position character a is smaller than the counting value of the information character b, the EXCLUSIVE-OR logic linking chain 6 connects the position character a in inverted form and the EXCLUSIVE-OR logic linking chain 8 connects the information character b in non-inverted form to the inputs of a first adder circuit 9. If, on the other hand, the counting value of the position character a is not smaller than the counting value of the information character b, the EXCLUSIVE-OR logic linking chain 6 supplies the position character in unchanged form and the EXCLUSIVE-OR logic linking chain 6 supplies the information character b in inverted form to the inputs of the adder circuit 9. Now, the absolute value of the difference between the values of the information character b and the position character a is available at the output of the adder circuit 9, and is compared, in a comparator circuit 10, with the counting value of half the number of attainable setting positions m of the type carrier.

If this difference value, which has been formed by the adder circuit 9, exceeds the value of half the attainable setting positions m, the comparison circuit 10 emits a second evaluation signal which is fed to the EXCLUSIVE-OR gate 7, to an EXCLUSIVE-OR logic linking chain 11 to which the difference value of the adder circuit 9 is applied, and to an AND logic linking chain 12, to which is applied a fixed value m + 1 which exceeds, by one, the attainable setting positions m of the type carrier. If an evaluation signal of this type is emitted from the comparison circuit 10, the difference value 1 in the adder circuit 9 is inverted, and the fixed value m + 1 applied to the AND logic linking chain 12 is directly fed to a second adder circuit 13, at the input of which the setting quantity to be executed by the stepping motor M for the type carrier can be obtained. This setting quantity can be converted into the drive pulse train for the stepping motor by means of measures known to those skilled in the art and will not be discussed herein. If the difference quantity determined by the adder circuit 9 is not greater than the quantity of half the attainable setting position m, this difference quantity is directly switched through to the outputs of the second adder cicruit 13.

By way of the EXCLUSIVE-OR logic linking element 7, an evaluation signal emitted by the comparison circuit 5 and an evaluation signal emitted by the comparison circuit 10 are logically linked to one another in such a manner that in the presence of only one of these two signals a control command is fed both to the counter circuit 3 and to the stepping motor control unit MS for the characterization of backward movement. If the comparison circuits 5 and 10 emit no evaluation signals or emit both evaluation signals simultaneously, the EXCLUSIVE-OR logic gate 7 feeds a control signal for backward motion, i.e. the motor control unit and the counter circuit normally operate in a forward direction defined as such.

The circuit arrangement illustrated in FIG. 3 is supplied with the information character b to be employed for the new setting position of the type carrier again via input lines 1, whereas the counter circuit 3 which is driven by way of the control line 2 and indicates the relevant position of the type carrier by a position character a, and which corresponds to the counter circuit illustrated in FIG. 1, is wired at its inverting outputs and thus makes available an inverted position character ā.

Both the supplied information character b and the inverted position character ā are fed to an adder circuit 14, wherein a difference value is formed from the information character b and the position character ā. An output carry which occurs in the last stage is transferred at the input to the adder circuit 14 and is fed, as a first evaluation signal, to the EXCLUSIVE-OR logic gate 7.

Furthermore, the output of the adder circuit 14 is inverted for the carry and is fed to an EXCLUSIVE-OR logic linking chain 15 to which the difference value, formed by the adder circuit 14, is applied. When a carrier is formed by the adder circuit 14, the difference quantity, determined by the adder circuit 14, of the information character b and the position character ā is switched through directly to the further EXCLUSIVE-OR logic linking chain 11, and in the absence of such a carry is inverted by the EXCLUSIVE-OR logic linking chain 15 and is switched through to the further EXCULSIVE-OR logic linking chain 11. The further treatment and exploitation of the signal and values is similar to the circuit arrangement illustrated in FIG. 2. The EXCLUSIVE-OR logic linking chain 11 and the adder circuit 13 are each shortened by one stage in comparison to the preceding circuits, as already only half the number of attainable setting positions can occur, at the maximum, in these switching units. The fixed value supplied to the AND logic linking chain 12 corresponds directly, however, to the setting positions m which can be assumed by the type carrier. Therefore, it is necessary to feed the evaluation signal, determined by the comparison circuit 10, as an input carry to the adder circuit 13.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for setting a rotatable type carrier, having character types carried on the periphery thereof, from one setting position by the shortest path of rotation to a new setting position, via a stepping motor, in response to pulse train elements derived from information characters input in binary coded form including new setting position and present setting position characters, comprising:
    a first comparison means for receiving the new and present position setting characters and emitting a first evaluation signal which is dependent upon the values of said characters relative to one another, including first means for forming the sum of the binary value of the low-value character and the inverted binary value of the higher-value binary character, and second means for forming a binary value corresponding to half the number of possible setting positions of the type carrier;
    a second comparison means connected to said first and second means and responsive to the binary values formed thereby to emit a second evaluation signal;
    switching means connected to said first and second comparison means and operable in response to said second evaluation signal to switch through the determined binary spacing quantity as a drive value when the same is equal to or less than half the attainable type carrier setting positions and to switch through the difference quantity between half the number of attainable type carrier setting positions and the determined binary spacing quantity as a drive value when the determined binary spacing quantity is greater than half the number of attainable type carrier spacing positions;
    EXCLUSIVE-OR logic means connected to said first and second comparison means and responsive to said first and second evaluation signals emits a control command to produce an oppositely directed rotation of the drive motor, in the presence of a new setting position character, when the new position character is greater than the present position character or when the determined spacing is greater than half the attainable setting positions.

2. The circuit arrangement set forth in claim 1, wherein said first comparison means comprises:
    a comparison circuit for receiving and comparing said new and present setting characters to form said first evaluation signal.

3. The circuit arrangement set forth in claim 1, wherein said first comparison means comprises:

an adder for receiving said new and present setting position characters, including means for inverting said present position character and means for providing the difference quantity from the inverted and new position characters.

4. The circuit arrangement set forth in claim 1, wherein said switching means comprises:
   a multi-stage EXCLUSIVE-OR logic linking circuit having parallel inputs connected to receive said determined spacing quantity and a common input connected to receive said second evaluation signal;
   storage means storing the number (m + 1) of attainable setting positions (m) increased by one;
   an AND logic linking circuit having an input connected to receive said second evaluation signal and parallel inputs connected to receive the increased number (m + 1);
   said EXCLUSIVE-OR and AND logic linking circuits each including parallel outputs; and
   an adder including parallel inputs connected to said parallel outputs of said EXCLUSIVE-OR and AND logic linking circuits.

5. The circuit arrangement set forth in claim 4, wherein said EXCLUSIVE-OR logic linking circuit, said AND logic circuit and said adder are each multi-stage and constructed to be shortened by one stage, and wherein said second evaluation signal is connected to said adder as an input-end carry signal.

6. The circuit arrangement set forth in claim 1, wherein said switching means comprises:
   a multi-stage EXCLUSIVE-OR logic linking circuit having parallel inputs connected to receive said determined spacing quantity and a common input connected to receive said second evaluation signal;
   storage means storing the number of attainable setting positions; and AND logic linking circuit having an input connected to receive said second evaluation signal and parallel inputs connected to receive said determined spacing quantity;
   said EXCLUSIVE-OR and AND logic linking circuits each having parallel outputs; and
   an adder including parallel inputs connected to said parallel outputs of said EXCLUSIVE-OR and AND logic linking circuits.

* * * * *